United States Patent [19]
McDowell et al.

[11] Patent Number: 5,313,915
[45] Date of Patent: May 24, 1994

[54] COAL SLURRY FUEL SUPPLY AND PURGE SYSTEM

[75] Inventors: Robert E. McDowell, Fairview, Pa.; Steven L. Basic, Hornell, N.Y.; Russel M. Smith, North East, Pa.

[73] Assignee: General Electric Company, Erie, Pa.

[21] Appl. No.: 968,081

[22] Filed: Oct. 27, 1992

[51] Int. Cl.$^5$ .............................................. F02B 45/00
[52] U.S. Cl. ........................................................ 123/23
[58] Field of Search ..................................... 123/23, 575

[56] References Cited

U.S. PATENT DOCUMENTS 4,782,794  11/1988  Hsu et al. .................................. 123/23
4,825,842  5/1989  Steiger ...................................... 123/23

Primary Examiner—Noah P. Kamen
Attorney, Agent, or Firm—R. Thomas Payne; Marvin Snyder

[57] ABSTRACT

A coal slurry fuel supply and purge system for a locomotive engines is disclosed which includes a slurry recirculation path, a stand-by path for circulating slurry during idle or states of the engine when slurry fuel in not required by the engine, and an engine header fluid path connected to the stand-by path, for supplying and purging slurry fuel to and from fuel injectors. A controller controls the actuation of valves to facilitate supply and purge of slurry to and from the fuel injectors. A method for supplying and purging coal slurry in a compression ignition engine is disclosed which includes controlling fluid flow devices and valves in a plurality of fluid paths to facilitate continuous slurry recirculation and supply and purge of or slurry based on the operating state of the engine.

20 Claims, 4 Drawing Sheets

COAL SLURRY FUEL SUPPLY AND PURGE SYSTEM

GOVERNMENT INVENTION

The invention was made with support of the Government of the United States of America under contract DE-AC21-88MC23174 awarded by the Department of Energy. The Government has certain rights in this invention and in any resulting patent, particularly to a coal slurry fuel supply and purge system.

BACKGROUND OF THE INVENTION

The invention relates generally to coal slurry fuel-injected combustion engines, and more particularly to coal-water slurry fuel supply and purge systems for compression ignition locomotive engines.

Conventional diesel engine fuel is a relatively low-grade, refined petroleum fuel oil which has desirable ignition and heat release characteristics. Diesel fuel oil typically has acceptably low levels of corrosive, abrasive and other noxious matter, and is generally in ample supply. However, it is known that other fuel mixtures, such as coal-water slurry fuel, may serve as an alternative lower cost fuel for compression ignition engines. Typically, coal slurry fuel may be in the form of either a dry powder or a liquid slurry which is generally a mixture of pulverized coal or other form of carbon dust in a liquid carrier such as oil or water.

The injection of coal-water slurry (hereinafter sometimes referred to as CWS) into an internal compression ignition engine, such as a large multi-cylindered diesel locomotive engine, poses problems not typically encountered in the injection of pure liquid fuels. An advantage of coal-water slurry is its low cost compared to higher grade petroleum fuels when petroleum prices become cost prohibitive. Consequently, significant development has been initiated to produce a vehicle capable of sufficiently utilizing CWS instead of conventional diesel fuel as an alternative fuel source. An article of general interest generally describing coal-fueled diesel engines for locomotives may be found in an article entitled "Coal-Fueled Diesel Engine Progress at GE Transportation Systems", authored by P.L. Flynn, B.D. Hsu and D.L. Leonard from the 13th Annual Energy-Sources Technology Conference and Exhibition held in New Orleans, La., Jan. 14–18, 1990, sponsored by the Internal Combustion Engine Division of the American Society of Mechanical Engineers. This article generally discloses a conceptual locomotive envisioned to utilize coal-water slurry but does not disclose a suitable fuel supply and purge system.

It has been predicted that significant fuel cost savings may result from the use of a coal-water slurry fuel in locomotive applications. However, a problem arises in integrating all of the systems into a working locomotive engine unit which can be operated in a railroad service. Normal CWS fuel supply systems are typically not suited for application in a locomotive engine given the amount of fuel required by a locomotive engine and the distance over which the fuel must be distributed throughout the engine. A problem arises since micronized coal particles mixed with water generally create a fuel which is difficult to store, pump and inject as compared with diesel fuel. Part of the reason is that the coal-water slurry tends to be unstable and to settle in tanks and fuel lines after a period of time, making it difficult to supply fuel to fuel injectors and distribute the fuel from the fuel tank throughout the operating cycle of the engine. Consequently, there exists a need to avoid long-term settling problems and to minimize losses throughout the fuel supply and distribution system.

SUMMARY OF THE INVENTION

It is an object of the present invention to provide a fuel supply and purge system for a coal slurry fueled compression ignition engine.

It is a further object of the invention to provide a locomotive engine having a coal slurry fuel supply and purge system capable of supplying a coal-water slurry fuel mixture to fuel injectors while facilitating the purge of a coal slurry fuel at predetermined times so as to facilitate proper engine operation.

It is a further object of the invention to provide a coal slurry fuel supply and purge system having a slurry fuel supply tank capable of providing agitation to the slurry mixture during the failure mode of a primary recirculating mechanism.

A coal slurry fuel supply and purge system for a locomotive engines is disclosed which includes a slurry recirculation path, a stand-by path for circulating slurry during states of the engine when slurry fuel in not required by the engine, and an engine header fluid path connected to the stand-by path, for supplying slurry fuel to fuel injectors and purging slurry fuel from fuel injectors. A controller controls the actuation of valves to facilitate supply and purge of slurry to and from the fuel injectors.

The preferred embodiment the system includes a slurry fuel supply tank, and a first slurry fuel recirculation mechanism, fluidly connected with the slurry fuel supply tank, for recirculating slurry in the slurry fuel supply tank during engine operation. The system also includes a purge fluid supply tank; a purge fluid pump, fluidly connectable with the purge fluid supply tank; a slurry fuel feed pump, fluidly connected to the slurry fuel supply tank; a thermal exchange device, fluidly connected with the slurry fuel pump; a fluid drain tank, fluidly connectable with the purge fluid pump, for draining purged fluid; a fluid pressure generating device, such as a charge pump, fluidly connectable to both the thermal exchange device and the purge fluid pump, for supplying slurry fuel under pressure to the fuel injectors; a fluid passage, fluidly connected to the injectors, for providing fluid flow back to the slurry supply means or the fluid drain compartment; and a controller, operatively coupled to valves such that selective control of the valve facilitates supply of slurry fuel to the injectors or purge of slurry fuel from the injectors during predetermined engine operating states.

A method for supplying and purging a coal slurry fuel to fuel injectors is disclosed which includes the steps of: recirculating the coal slurry fuel in a coal slurry fuel supply tank to maintain a suitable coal slurry fuel mixture; activating a coal slurry fuel feed pump to inject coal slurry fuel from said fuel supply tank through a fluid path; activating a fuel pressure generating device, such as a charge pump, to force coal slurry fuel to the fuel injectors at a first flow rate; increasing the flow rate of the fuel pressure generating device to a second flow rate during operation of the engine; activating a fuel purge pump to purge coal slurry from the injectors when coal slurry fuel is not required by the engine; and de-activating the fuel charge pump and the fuel purge pump while maintaining coal slurry fuel flow through the fluid path.

DESCRIPTION OF THE PREFERRED EMBODIMENT

Figure 1A:
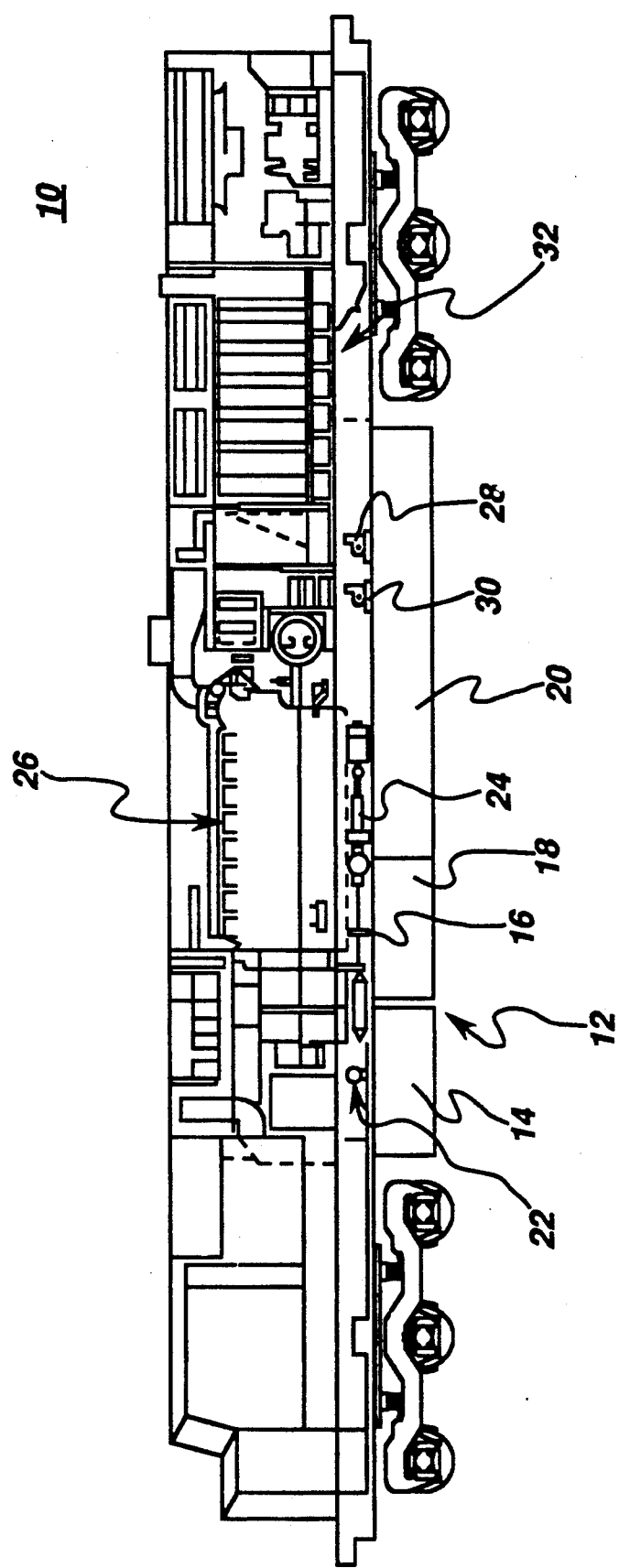
FIG. 1A is a side view of a locomotive incorporating the coal slurry supply and purging system in accordance with the invention.

FIG. 1A schematically depicts a locomotive 10 having a coal slurry fuel supply and purge system incorporated on a single platform. Such a locomotive 10 may include a partitioned fluid tank 12 having a section for housing diesel fuel 14, a section for housing purge water 16, a section for housing waste purge water 18 and a large coal-water slurry tank for housing the primary slurry fuel 20. The locomotive 10 may also include a CWS recirculation pump 22, a fuel charge pump 24, a compression ignition combustion engine 26, a purge water pump 28, a CWS feed pump 30, and a thermal exchange device 34, such as a heat exchanger, the interconnection of which and purpose of which will be described later. The locomotive 10 may also include a particulate vacuum extraction mechanism 32 to remove unwanted emission particles prior to disbursement into the air.

Figure 1B:
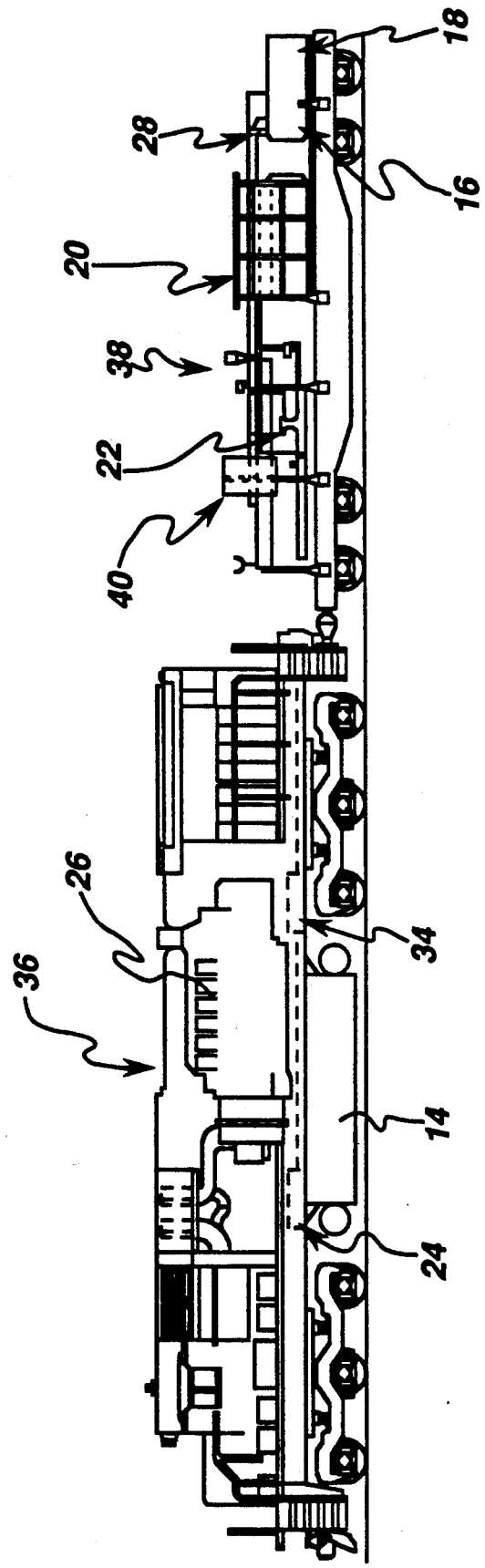
FIG. 1B a side view of a modified locomotive and tender incorporating the coal slurry supply and purging system in accordance with the invention.

FIG. 1B discloses another embodiment incorporating the slurry fuel supply and purge system as adapted to a conventional diesel locomotive 36 such as a modified model 7FDL manufactured by General Electric Transportation Systems, Erie, Pa. Such locomotive 36 is a microprocessor-controlled, six-axle locomotive, having motor-driven blowers, radiator fans, and air compressor. The engine 26 may be a 4-stroke compression-ignition engine of 229 mm cylinder bore and 267 mm piston stroke. Modification includes adding dual positive-displacement fuel injection systems. This includes adding two sets of mechanical jerk pumps, piston isolation pumps, and twin positive displacement fuel injectors, with a modified fuel-rack linkage as known in the art.

The CWS fuel injection system is used exclusively at higher power levels (for example, locomotive throttle positions N4-N8). The positive-displacement design has the capability to provide the full-load CWS fuel quantity required for each cylinder. A larger-than-standard main injector is centrally-mounted in each cylinder head to inject the coal slurry fuel.

A pilot fuel injection system (also schematically seen in FIG. 2) provides both the small amount of diesel fuel needed at high power, to enhance coal combustion, and also the large amount for starting and lower power running (idle through N4), where there is no CWS injection. Each pilot injector is mounted off-center in the cylinder head, spraying from the side.

A governor-modulated fuel-rack linkage controls the amount of both CWS and diesel fuel injected into the cylinders on the 12-cylinder coal-fueled diesel engine. The linkage synchronizes both CWS and pilot jerk pumps on all twelve cylinders during start up, acceleration on diesel fuel, transition to coal combustion, and high power running on CWS. Additionally, a remote-controlled electric linear actuator on each bank is provided to decrease the amounts of diesel fuel added to the cylinders during coal combustion.

The slurry fuel supply and purge system is primarily contained on a tender 38 connected to the locomotive 36. Such a combination of locomotive 36 and tender 38 has been used to perform tests on the inventive fuel slurry supply and purge system. As previously disclosed with reference to FIG. 1A, the embodiment in FIG. 1B also includes the slurry fuel tank 20, an individual purge water tank 16, a waste water purge tank 18, and a diesel fuel tank 14. The tender 38 also houses an electronic controller 40 for controlling relay activated valves incorporated in the slurry fuel supply and purge system and also houses the recirculating pump 22 and the water purge pump 28. The heat exchanger 34 is mounted on the locomotive 36 as well as the charge pump 24. As shown, the locomotive 10 in FIG. 1A may be extended in length to accommodate the additional pumps, electronic controls and fluid tanks as required by the slurry fuel supply and purge system.

Figure 2:
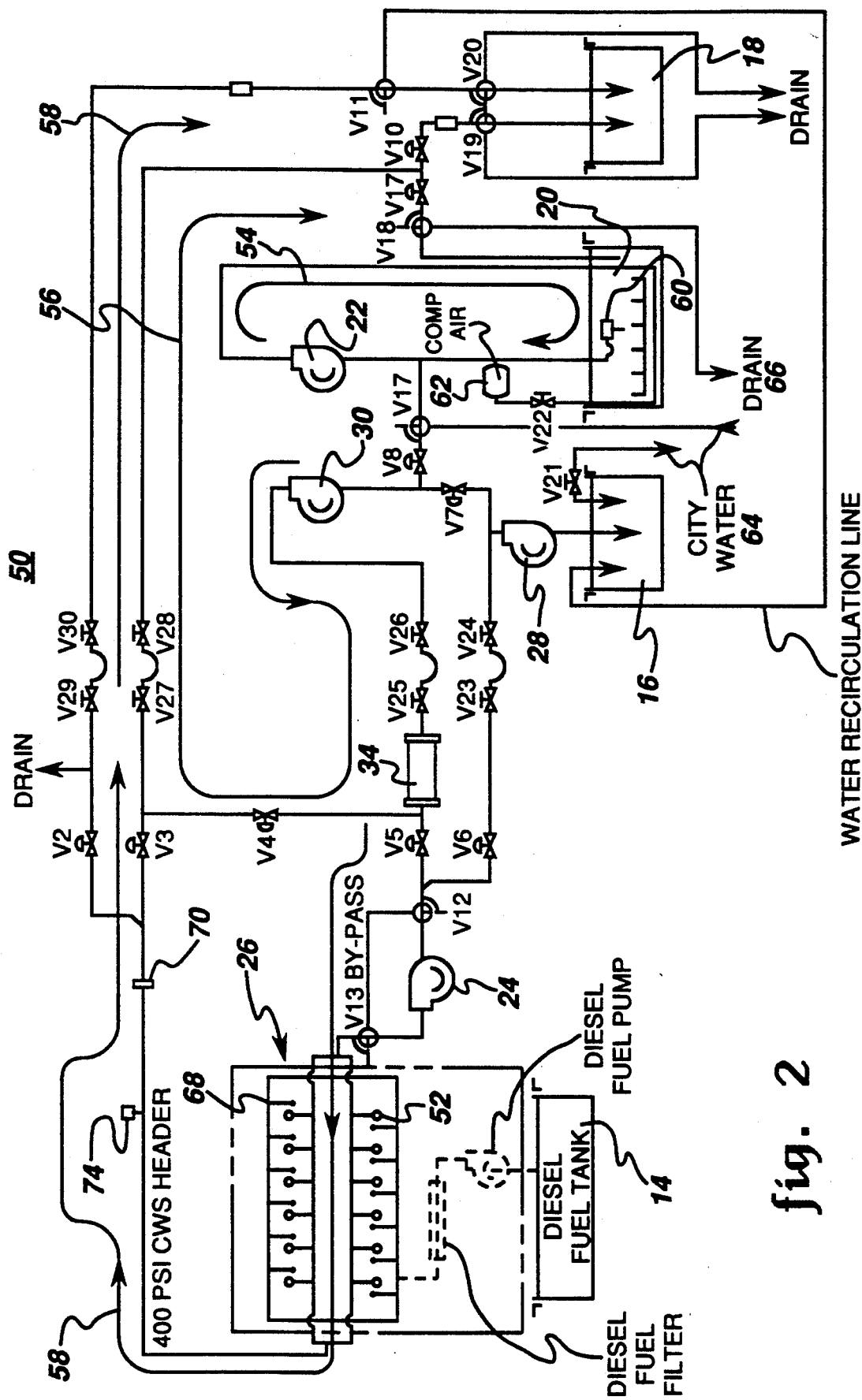
FIG. 2 is a schematic generally depicting the coal slurry supply and purging system in accordance with the invention.

FIG. 2 schematically represents the preferred embodiment of the inventive slurry fuel supply and purge system 50. The slurry fuel supply and purge system 50 incorporates a plurality of fluid flow paths to facilitate both supplying slurry fuel to the slurry fuel injectors and to purge slurry fuel from the fuel injectors. The system 50 includes a recirculation path 54, a stand-by fluid path 56 and an engine header fluid path 58.

A plurality of slurry fuel injectors, generally indicated at 52, and pilot fuel injectors 53 make up a portion of an engine header 68. A slurry injector by-pass path 76 allows the slurry to continue to move through the injection system to avoid settling and clogging of the coal particles in the fluid lines.

The recirculation path 54 recirculates slurry fuel in the slurry fuel supply tank 20 to insure that the coal and water mixture is sufficient so as to be combustible when injected in the engine. The recirculation path 54 continuously recirculates slurry when the locomotive is operational.

The fluid path 56 facilitates the flow of coal slurry fuel during periods when the engine does not require slurry to be passed through the injectors 52. The engine header path 58 connects with the fluid path 56 to facilitate the flow of coal slurry through the injectors during periods of time when slurry fuel may be injected by the engine.

The electrical controller 40 (shown in FIG. 1B) includes a programmable micro-controller to control the system 50 through relay actuation of valves. The valves are controlled to provide the proper timing and sequencing to facilitate both CWS fuel supply and purging. Drain valves, located throughout the locomotive, enable the piping to be drained if they cannot be purged for some reason.

The controller 40 may be operated by a manual selector switch with following positions: (1) charge locomotive circulation, (2) charge engine header, (3) run engine, (4) purge engine header, (5) locomotive circulation standby, and (6) purge locomotive circulation. However, it will be recognized that a computer may also be used in the place of the manual selector switch. Valves V2-V30 are shown throughout the system 50 wherein valve numbers V2 through V11 are electronically controlled by the electronic controller 40 and valve numbers V12 through V30 are manually actuated valves. For purposes of discussion, valves V23 through V30 will be maintained in an open state thereby allowing fluid to flow through the valves.

As shown, the recirculation path 54 includes the recirculating pump 22 connected to the CWS supply tank 20 via suitable conduit or piping. The CWS is recirculated to prevent coal from settling out of the mixture in the tank. The pump 22 draws from a floating suction line 60 within the tank, where the CWS will be less concentrated, and returns through two perforated lines across the bottom of the tank, where the CWS will be more concentrated.

A suitable CWS recirculation pump 22 may be rated at 360 L/min and 350 kPa and may be a double-diaphragm air-operated pump. An auxiliary agitating mechanism 62 is also connected to the slurry fuel supply tank 20 through suitable piping connections via valve 22. The auxiliary agitating mechanism 62 may be an air compressor or other suitable device which provides compressed air through tubes inside the tank to agitate the fuel slurry mixture when the recirculation pump malfunctions or is otherwise inadequate for providing suitable agitation.

The stand-by path 56 incorporates the feed pump 30 and thermal exchange device 34 which are fluidly connected to a fluid path for passing fluid from the CWS supply tank 20 to the drainage tank 18 or back to the CWS supply tank through a series of valves. The feed pump 30 may be an air-driven (72 L/min at 350 kPa) double-diaphragm pump. The thermal exchange device 34 may be a tube-in-shell (where CWS flows through the tubes and the shell side contains thermostatically-controlled water) and maintains the temperature of the CWS supplied to the engine charge pump 24.

The engine header path 58 incorporates the charge pump 24 and engine header 68 which fluidly connect to a fluid path for passing fluid from the engine header 68 to the CWS supply tank 20 or the waste tank 18 through a series of valves. The stand-by path 56 and the engine header path 58 fluidly connect via valves V4 and/or V5.

A strainer (not shown) may also be located before the charge pump 24 to filter any larger contaminants in the CWS fuel supply. A 28 mesh screen filter may be used to filter dirt and coagulated CWS lumps. It was found that a smaller mesh would drive the pressure drop up too high and eventually filter out the desired coal.

The CWS is supplied to the engine header 68 by the progressing-cavity charge pump 24. An orifice 70 in the engine header path 58 provides back-pressure to the engine charge pump 24, which maintains the pressure constant by variable-speed motor controls. The orifice 70 may be a flanged section having distal ends of approximately 1¼ diameter openings with a center having a 0.5" diameter opening. The progressing-cavity charge pump 24 may distribute up to 72 L/min of CWS at 2.8 MPa to all of the piston isolation pumps atop the engine cylinders.

The CWS fuel supply tank 20 contains two 50 mm diameter recirculation tubes, with 8 mm holes, spaced 100 mm apart, and angled 30 degrees downward, run along the bottom of the tank. The auxiliary agitation mechanism includes two compressed air bubbling lines, 25 mm in diameter, with horizontal 3 mm holes, 100 mm apart, are also in the bottom of the tank to keep the CWS agitated if recirculation fails.

When the engine is not running on CWS for long periods of time, it is necessary to flush the CWS system with clean water; the CWS piping must be either purged or drained to prevent the coal particles from settling out of the slurry. As shown, draining of the various tanks and fluid lines may be accomplished through respective valves. For example, valve 20 may be used to drain fluid from the waste water tank 18, while valve 18 may be used to drain fuel from the fuel supply tank 20.

Also, a suitable CWS fuel may be of a type obtained from Otisca, Inc. in Syracuse, N.Y., and may be prepared from micronized and de-ashed Kentucky Blue Gem coal to 49.0% coal loading by weight, with less than 1% ash and 5 micron means diameter particle size. Such a mixture may have a heating value of approximately 34630 kJ/kg. Anti-agglomerating additive Triton X-114 may be added to the CWS at 2% of coal weight.

In operation, the CWS tank recirculation loop 54 is always operating to ensure the coal remains in suspension in the CWS fuel. Initially, the engine 26 is started and warmed up in a normal fashion until the lube oil reaches 80° C.

To charge the stand-by path 56, the feed pump 30 is started to initiate the charging of the locomotive CWS piping. The controller 40 opens valves V4, V8, V10. Purge water left in the locomotive circulation piping is cleared by pumping CWS from the CWS fuel tank 20. When all purge water has been pushed into the waste water tank 18, the controller 40 routes CWS back into the CWS tank 20 by closing valve V10 and opening valve V9. The feed pump 30 continues circulating CWS from the CWS supply tank 20 through the stand-by path 56.

To charge the engine header path 58, the engine charge pump 24 is started at slow speed. The controller 40 opens valves V3, V5, V8, V10, and closes valves V4 and V9. The charge pump 24 then pumps the CWS through the engine header 68 pushing purge water out into the waste water tank 18. When all the purge water has been pushed into the waste water tank 18, CWS is re-routed from the engine header 68 back to the CWS supply tank 20 by opening V10 and closing V9.

During engine run mode, the engine charge pump 24 is run at high speed to feed CWS to the engine CWS fuel injectors 52. Feedback from a pressure transducer 74 mounted near the orifice is used to control charge pump speed to maintain a CWS pressure of approximately 2.8 MPa at the engine. During this state, the locomotive will be running on CWS fuel.

Transition into running on CWS fuel begins by increasing the throttle to a selected notch (N4 600 kW at 880 rev/min). One linear rack actuator is retracted to decrease the diesel fuel injected on that cylinder bank. At this point, the engine governor attempts to compensate for the lower diesel fuel delivery by increasing the CWS fuel injection. After the governor stabilizes, the other actuator is retracted—the engine will now be running on CWS.

Transition out of running on CWS fuel is done by returning the throttle to a lower notch, then extending both rack actuators simultaneously. At full extension, the engine is returned to running solely on diesel fuel. The locomotive throttle is now decreased to N3 (300 kW at 880 rev/min) and the CWS fuel injectors are purged with water during the next state.

To purge the engine header or injectors 52, the engine charge pump 24 is returned to low speed and the purge water pump 28 is started. The controller 40 opens valves V2, V4, V6, V8, V9, and closes valves V3, V5, and V7. This routes water from the clean water tank 16 through the engine header 68 to the waste water tank 18. CWS in the engine will be pushed into the waste water tank 18. When the engine purge is complete, the purge water pump 28 and engine charge pump 24 are stopped by the controller 40.

During engine stand-by or idle, the feed pump 22 continues to circulate CWS through the stand-by path 56 while the engine runs on diesel fuel alone. At this state there is an option to either return to the charge engine header state or go on to the next state (valve conditions remain the same as during the stand-by mode).

To purge the stand-by path 56, the purge water pump 28 is now restarted to pump water from the clean water tank 16 through the locomotive circulation lines. The controller 40 opens valves V4, V7, V9, and closes valves V2, V3, V5, V6, V8. After a predetermined time interval, and prior to the complete purging of the CWS, the purge water is routed into the waste water tank 18 from the CWS tank 20 by opening V10 and closing V9. When all lines have been purged, the purge water pump 28 is stopped by the controller 40; only the CWS fuel tank recirculation path 54 is operating at this point.

Normally, the coal-fueled diesel engine is started and run in the lower throttle positions (N1-N3) using the pilot diesel fuel, then the CWS will gradually be introduced. This process requires smooth throttle changes both upward and downward. It was found during testing, however, that the auxiliary loads cause a tremendous change in the governor modulation, and thus the fuel-rack linkage. The auxiliary loads were then set to be either full on or off during transition into CWS running for first stage. Therefore, suitable control of the loads may be required for various operating conditions. Therefore, the engine fuel-rack linkage may need to be set for correct conditions at a given throttle position to transition properly.

Figure 3:
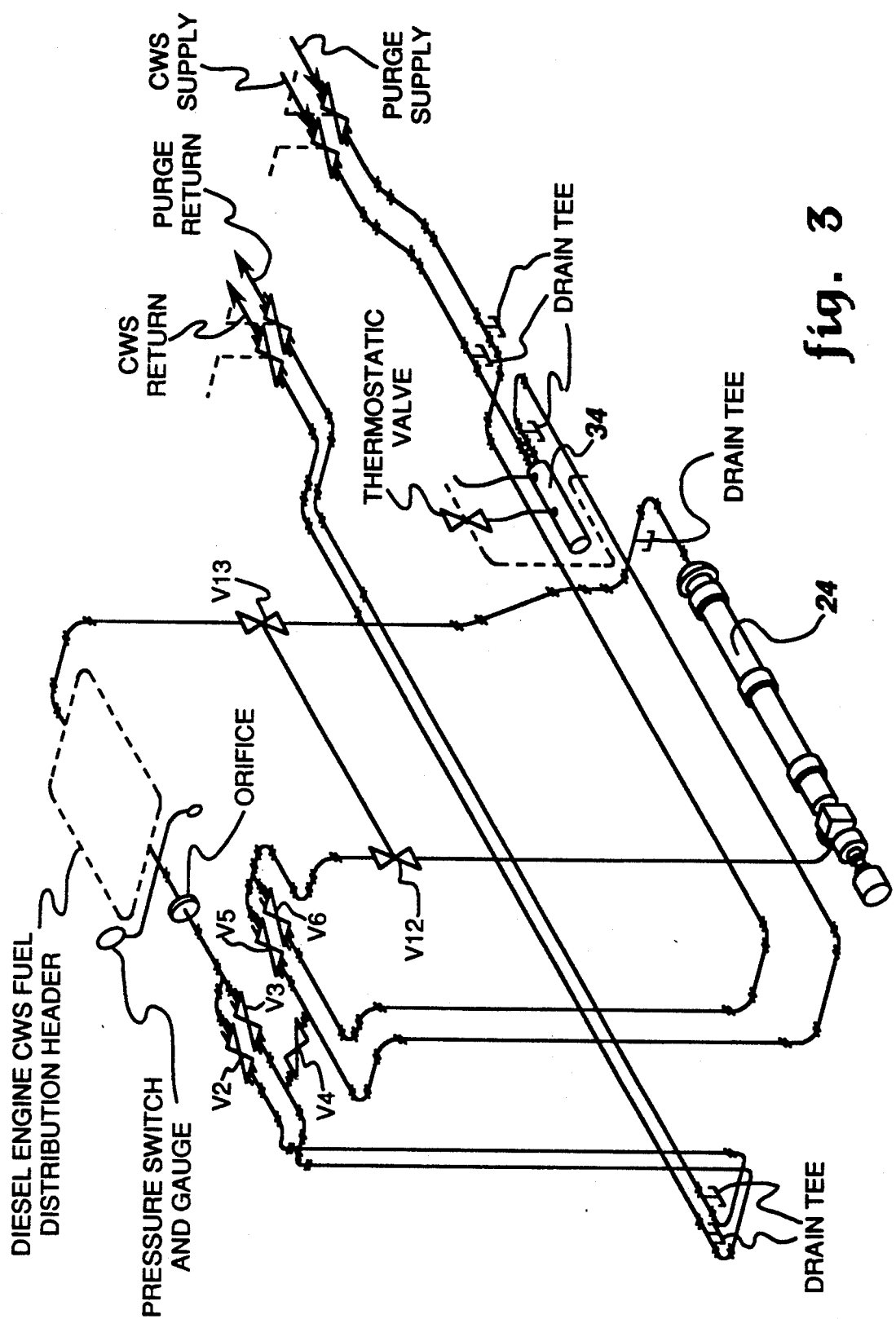
FIG. 3 is an isometric view of a portion of the coal slurry supply and purging system in accordance with the invention.

FIG. 3 schematically depicts portions of the fluid path 56 and the header circulation path 58 as previously described. As shown, a by-pass line in parallel with the charge pump 24 may be manually opened via valves V12 and V13 to drain the system 50 when the system is shut down.

In addition, the fuel supply and purge system 50 may be connected to an external purge supply fluid such as a hose connected to a municipality water supply, through connection ports 64 and 66 so that a locomotive may be filled with purge water while stationed on the tracks at a stop.

It will be recognized that where a separate electronic fuel injection system controls injection of the pilot fuel, as may be the case with conventional diesel locomotive engines, a coal-fueled diesel engine may have dual electronic fuel injection controllers; one for the pilot fuel injection and one for the slurry fuel injection. However, it may be cost effective to combine the operations of both control systems into one controller.

While the method and devices herein described constitute the preferred embodiment of the invention, it is to be understood that the invention is not limited to these precise methods and devices and that changes may be made therein without departing from the scope of the invention which is defined in the appended claims. For example, a suitable electric circulation heater (not shown) may be used in the CWS fuel tank recirculation line to prevent freezing of the CWS during low ambient temperatures.

What is claimed is:

1. A coal slurry fuel supply and purge system for a locomotive engine having fuel injection means, the system comprising:
   slurry fuel supply means;
   first slurry fuel recirculation means, fluidly connected with the slurry fuel supply means, for recirculating slurry in the slurry fuel supply means during engine operation;
   purge fluid supply means;
   purge fluid pump means, fluidly connectable with the purge fluid supply means;
   slurry fuel pump means, fluidly connected to the slurry fuel supply means;
   thermal exchange means, fluidly connected with the slurry fuel pump means;
   fluid drain means, fluidly connectable with the purge fluid pump means, for draining purged fluid;
   fluid pressure generating means, fluidly connectable to the thermal exchange means and the purge fluid pump means, for supplying slurry fuel under pressure to the fuel injection mans;
   fluid passage means, fluidly connected to the fuel injection means, for providing fluid flow back to the slurry supply means or the fluid drain means; and
   control means, operatively coupled to valve means for selectively controlling the valve means to supply the slurry fuel to the fuel injection means or to purge the slurry fuel from the fuel injection means during predetermined engine operating states.

2. The system of claim 1 further comprising: a second slurry fuel recirculation means, operatively connected to the slurry fuel supply means, for recirculating slurry in the flurry fuel supply means when the first slurry fuel recirculation means is not operating.

3. The system of claim 2 further comprising:
   pilot fuel supply means, coupled to the fuel injection means, for providing flow of pilot fuel during predetermined periods of engine operation.

4. The system of claim 1 further comprising:
   means for coupling an external purge fluid to the purge fluid supply means.

5. The system of claim 1 further comprising:
   fluid by-pass means, connected in parallel with the fluid pressure generating means, for by-passing fluid flow around the fluid pressure generating means for draining the system after engine shut-down.

6. The system of claim 1 further comprising:
   signal controlled valve means, operatively connected to the fluid passage means and the purge fluid supply means, for directing purge fluid between either the drain means or the purge fluid supply means.

7. A method for supplying and purging a coal slurry fuel to a compression ignition engine having fuel injection means comprising the steps of:
   recirculating the coal slurry fuel in a coal slurry fuel supply tank to maintain a suitable coal slurry fuel mixture;
   activating a coal slurry fuel feed pump means to move the coal slurry fuel from the fuel supply tank through a fluid path;

activating fuel pressure generating means, fluidly connected to the fluid path, for transporting the coal slurry fuel to the fuel injection means at a first flow rate;

increasing the flow rate of the fuel pressure generating means to a second flow rate during operation of the engine at least partially on coal slurry fuel; and activating a fuel purge pump means for purging coal slurry and from the injection means when coal slurry fuel is not required by the engine.

8. The method of claim 7 further comprising the step of:

activating the fuel purge pump means for purging the coal slurry fuel from the fluid path while continuing to recirculate the coal slurry fuel in the coal slurry fuel supply tank.

9. The method of claim 7 wherein the step of activating fuel pressure generating means further comprises the step of:

sending a control signal to valve means for directing coal slurry fuel flow from the fluid path to the fuel injection means.

10. The method of claim 7 further comprising the step of:

de-activating the fuel pressure generating means and the fuel purge pump means while maintaining coal slurry fuel flow through the fluid path.

11. A coal slurry fuel supply and purge system for an engine having a fuel injection system, the system comprising:

at least one slurry fuel supply device;

at least a first slurry fuel recirculation apparatus operatively connected to the slurry fuel supply device, for recirculating slurry in the slurry fuel supply device during engine operation;

at least one purge fluid supply device;

at least one purge fluid pump device, operatively connectable to the purge fluid supply device;

at least one slurry fuel pump device, operatively connected to the slurry fuel supply device;

at least one thermal exchange device, operatively connected to the slurry fuel pump device;

at least one fluid drain device, operatively connectable to the purge fluid pump device, for draining purged fluid;

at least one fluid pressure generating device, operatively connectable to the thermal exchange device and the purge fluid pump device, for supplying slurry fuel under pressure to the fuel injection system;

at least one fluid passage device, operatively connected to the injection system, for providing fluid flow back to the slurry supply device or a fluid drain device; and at least one control device, operatively connected to valve means for selectively controlling the valve means to supply the slurry fuel to the injection means or to purge the slurry fuel from the fuel injection means during predetermined engine operating states.

12. The system of claim 11 further comprising:

a second slurry fuel recirculation device, operatively connected to the slurry fuel supply device, for recirculating slurry in the slurry supply device when the first recirculating is not operating.

13. The system of claim 12 further comprising:

at least one pilot fuel supply device, operatively connected to the fuel injection system, for providing flow of pilot fuel during predetermined periods of engine operation.

14. The system of claim 11 further comprising:

a device for coupling an external purge fluid to the purge fluid supply device.

15. The system of claim 11 further comprising:

at least one fluid by-pass device, connected in parallel with the fluid pressure generating device, for by-passing fluid flow around the fluid pressure generating device in order to drain the system after engine shut-down.

16. The system of claim 11 further comprising:

at least one signal controlled valve, operatively connected to the fluid passage device and the purge fluid supply for directing purge fluid between either the drain device or the purge fluid supply device.

17. A method for supplying and purging a coal slurry fuel in a compression ignition engine having a fuel injection system comprising the steps of:

recirculating the coal slurry fuel in at least one coal slurry fuel supply tank to maintain a suitable coal slurry fuel mixture therein;

activating at least one coal slurry fuel feed pump device to move the coal slurry fuel from the fuel supply tank through a fluid path;

activating at least one fuel pressure generating device, operatively connected to the fluid path, for transporting the coal slurry fuel to the fuel injection system at a first flow rate;

increasing the flow rate of the fuel pressure generating device to a second flow rate during operation of the engine at least partially on the coal slurry fuel; and activating at least one fuel purge pump device for purging coal slurry from the fuel injection system when coal slurry fuel is not required by the engine.

18. The method of claim 17 further comprising the step of:

activating the fuel purge means for purging the coal slurry fuel from the fluid path while continuing to recirculate the coal slurry fuel in the coal slurry fuel supply tank.

19. The method of claim 17 wherein the step of activating the fuel pressure generating device further comprises the step of:

sending a control signal to valve means for directing coal slurry fuel flow from the fluid path to the fuel injection system.

20. The method of claim 17 further comprising:

de-activating the fuel pressure generating device and the fuel purge pump device while maintaining coal slurry fuel flow through the fluid path.

* * * * *